US012591103B2

(12) United States Patent
Hwang et al.

(10) Patent No.: US 12,591,103 B2
(45) Date of Patent: Mar. 31, 2026

(54) CAMERA MODULE

(71) Applicant: LG INNOTEK CO., LTD., Seoul (KR)

(72) Inventors: Sun Min Hwang, Seoul (KR); Je Kyung Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 292 days.

(21) Appl. No.: 18/247,364

(22) PCT Filed: Oct. 14, 2021

(86) PCT No.: PCT/KR2021/014246
§ 371 (c)(1),
(2) Date: Mar. 30, 2023

(87) PCT Pub. No.: WO2022/086055
PCT Pub. Date: Apr. 28, 2022

(65) Prior Publication Data
US 2023/0418020 A1 Dec. 28, 2023

(30) Foreign Application Priority Data

Oct. 21, 2020 (KR) ........................ 10-2020-0136644

(51) Int. Cl.
*G02B 7/02* (2021.01)
*G03B 17/12* (2021.01)
(52) U.S. Cl.
CPC ............. *G02B 7/025* (2013.01); *G03B 17/12* (2013.01)
(58) Field of Classification Search
None
See application file for complete search history.

(56) References Cited

U.S. PATENT DOCUMENTS

| | | | |
|---|---|---|---|
| 2006/0077519 A1* | 4/2006 | Floyd ................. | G02B 26/0841 359/290 |
| 2016/0097912 A1* | 4/2016 | Kobori ................. | G02B 7/028 359/820 |
| 2017/0276895 A1* | 9/2017 | Sakuma ................. | G02B 7/022 |
| 2017/0280558 A1* | 9/2017 | Ohara ................. | G03B 17/02 |

(Continued)

FOREIGN PATENT DOCUMENTS

| | | |
|---|---|---|
| JP | 2020-60795 A | 4/2020 |
| JP | 2020-166270 A | 10/2020 |

(Continued)

OTHER PUBLICATIONS

International Search Report dated Jan. 20, 2022 in International Application No. PCT/KR2021/014246.

(Continued)

*Primary Examiner* — Ryan Crockett
(74) *Attorney, Agent, or Firm* — Saliwanchik, Lloyd & Eisenschenk

(57) ABSTRACT

A camera module comprises: a lens holder including side parts and a top part having an opening; a lens module coupled to the lens holder; and a substrate, which is coupled to the lens holder and has an image sensor arranged thereon, wherein the lens module has a first protrusion part arranged under the top part of the lens holder, and includes a first coupling member for coupling the first protrusion part to the top part of the lens holder.

17 Claims, 8 Drawing Sheets

(56) References Cited

U.S. PATENT DOCUMENTS

| | | | | |
|---|---|---|---|---|
| 2019/0196134 A1* | 6/2019 | Yuan | ...................... | G02B 7/022 |
| 2019/0243086 A1* | 8/2019 | Rodda | ................... | G02B 7/021 |
| 2020/0310227 A1* | 10/2020 | Hubert | ................... | G03B 17/08 |
| 2022/0252964 A1* | 8/2022 | Kim | ....................... | H04N 23/57 |

FOREIGN PATENT DOCUMENTS

| | | | |
|---|---|---|---|
| KR | 10-0813211 | B1 | 3/2008 |
| KR | 10-2016-0009866 | A | 1/2016 |
| KR | 10-2016-0041919 | A | 4/2016 |
| KR | 10-2017-0084552 | A | 7/2017 |
| KR | 10-1985621 | B1 | 6/2019 |
| TW | I399567 | B * | 6/2013 |
| WO | 2014/167994 | A1 | 10/2014 |
| WO | 2017/122970 | A1 | 7/2017 |

OTHER PUBLICATIONS

Supplementary European Search Report dated Aug. 13, 2024 in European Application No. 21883126.1.
Office Action dated May 17, 2025 in Chinese Application No. 202180071838.8.
Office Action dated Jul. 22, 2025 in Japanese Application No. 2023-524154.
Office Action dated Dec. 9, 2025 in Japanese Application No. 2023-524154.
Office Action dated Feb. 8, 2026 in Korean Application No. 10-2020-0136644.

* cited by examiner

CAMERA MODULE

CROSS-REFERENCE TO RELATED APPLICATIONS

This application is the U.S. national stage application of International Patent Application No. PCT/KR2021/014246, filed Oct. 14, 2021, which claims the benefit under 35 U.S.C. § 119 of Korean Application No. 10-2020-0136644, filed Oct. 21, 2020, the disclosures of each of which are incorporated herein by reference in their entirety.

TECHNICAL FIELD

The present embodiment relates to a camera module.

BACKGROUND ART

Recently, a subminiature camera module has been developed, and the miniature camera module is widely used in small electronic products such as smart phones, laptop computers, and game consoles.

As the spread of automobiles has become popular, subminiature cameras are widely used not only in small electronic products but also in vehicles. For example, black box cameras for vehicle protection or objective data on traffic accidents, rear surveillance cameras enabling the driver to monitor blind spots at the rear of the vehicle through a screen to ensure safety when reversing the vehicle, ambient detection cameras capable of monitoring the surroundings of the vehicle, and the like are provided.

The camera may be provided with a lens, a lens holder accommodating the lens, an image sensor converting an image of a subject collected in the lens into an electrical signal, and a printed circuit board on which the image sensor is mounted. The housing forming the outer appearance of the camera has a structure in which the entire region is sealed to inhibit internal components from being contaminated by foreign substances including moisture.

Mechanisms such as housing or lens holders can be expand at high temperatures and shrunk at low temperatures according to temperature changes. Such deformation of the mechanism has a problem of changing the distance between the image sensor and the lens.

DETAILED DESCRIPTION OF THE INVENTION

Technical Subject

An object of the present embodiment is to provide a camera module capable of minimizing a change in a distance between an image sensor and a lens due to temperature change by improving the structure.

Technical Solution

The camera module according to the present embodiment comprises: a lens holder including a side portion and a top part formed with an opening; a lens module being coupled to the lens holder; and a substrate being coupled to the lens holder and on which an image sensor is disposed, wherein the lens module includes a first protrusion part being disposed below a top part of the lens holder, and includes a first coupling member for coupling the first protrusion part to the top part of the lens holder.

The first coupling member may include an epoxy.

A material of the lens holder may include a plastic.

A rear body being disposed on a rear surface of the lens holder may be included.

A separation part may be disposed between the lens holder and the rear body, and a second coupling member may be disposed in the separation part.

The second coupling member may include an epoxy.

A lower end of the lens module may be disposed at a lower portion than the second coupling member in an optical axis direction.

The thermal expansion coefficient of the first coupling member may be greater than the thermal expansion coefficient of the second coupling member.

The thermal expansion coefficient of the first coupling member may be 2 to 6 times greater than that of the second coupling member.

A camera module according to another embodiment comprises: a lens module including a lens; a lens holder being coupled to the lens module; a substrate being coupled to the lens holder and on which an image sensor is disposed; a first coupling member for coupling the lens module and the lens holder; and a second coupling member for coupling the substrate and the lens holder, wherein the thermal expansion coefficient of the first coupling member is greater than the thermal expansion coefficient of the second coupling member.

Advantageous Effects

According to the present invention, since the deformation of the housing due to temperature change is compensated through the coupling member, here are advantages in that the distance between the image sensor and the lens module can be kept constant, and accordingly, the resolution of the camera module can be stabilized.

BRIEF DESCRIPTION OF DRAWINGS

FIG. 1 is a perspective view of a camera module according to a first embodiment of the present invention.

FIG. 7 is a perspective view of a camera module according to a second embodiment of the present invention.

FIG. 8 is a cross-sectional view of a camera module according to a second embodiment of the present invention.

BEST MODE

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

The 'optical axis direction' used below is defined as the optical axis direction of the lens. Meanwhile, the 'optical axis direction' may correspond to 'up and down directions', 'z-axis directions', and the like.

A camera module according to an embodiment of the present invention may be a vehicle camera module, but is not limited thereto.

Hereinafter, the present invention will be described in more detail with reference to the accompanying drawings.

Figure 1:
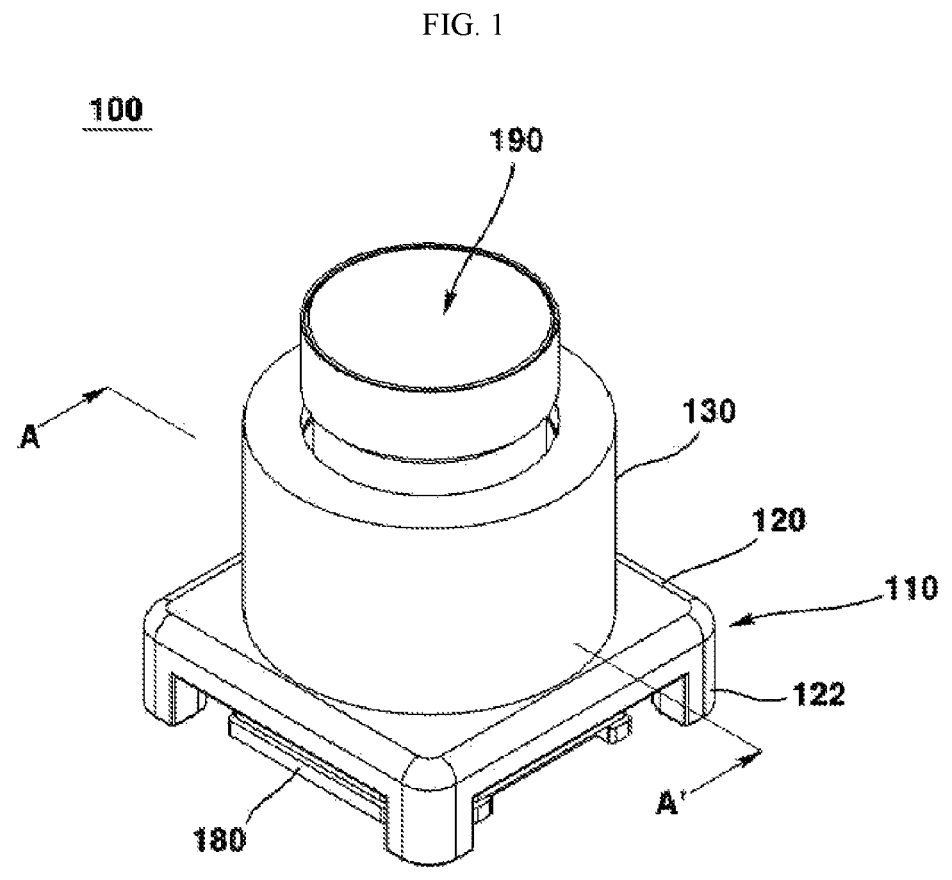
Figure 2:
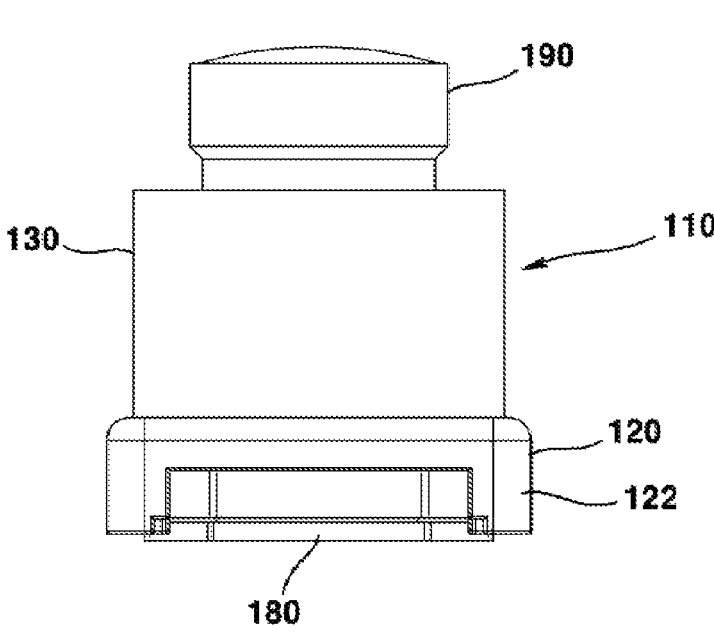
FIG. 2 is a plan view illustrating a side surface of a camera module according to a first embodiment of the present invention.
Figure 3:
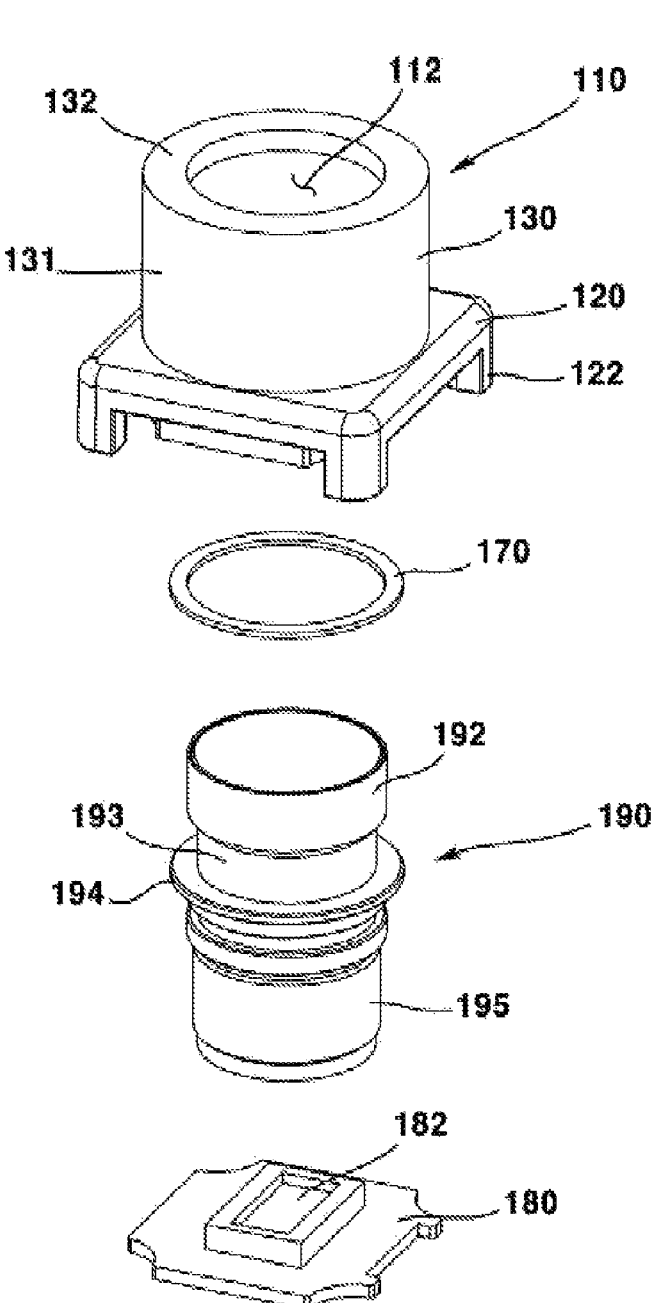
FIG. 3 is an exploded perspective view of a camera module according to a first embodiment of the present invention.
Figure 4:
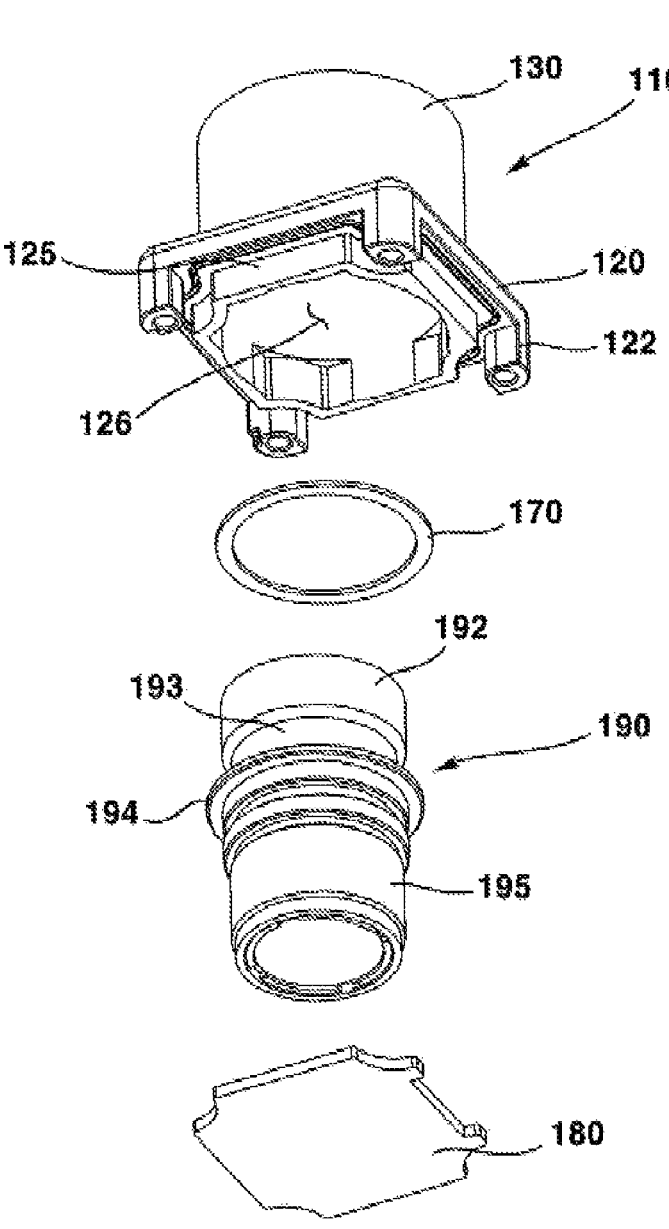
FIG. 4 is an exploded perspective view of a camera module illustrating FIG. 3 from another angle.
Figure 5:
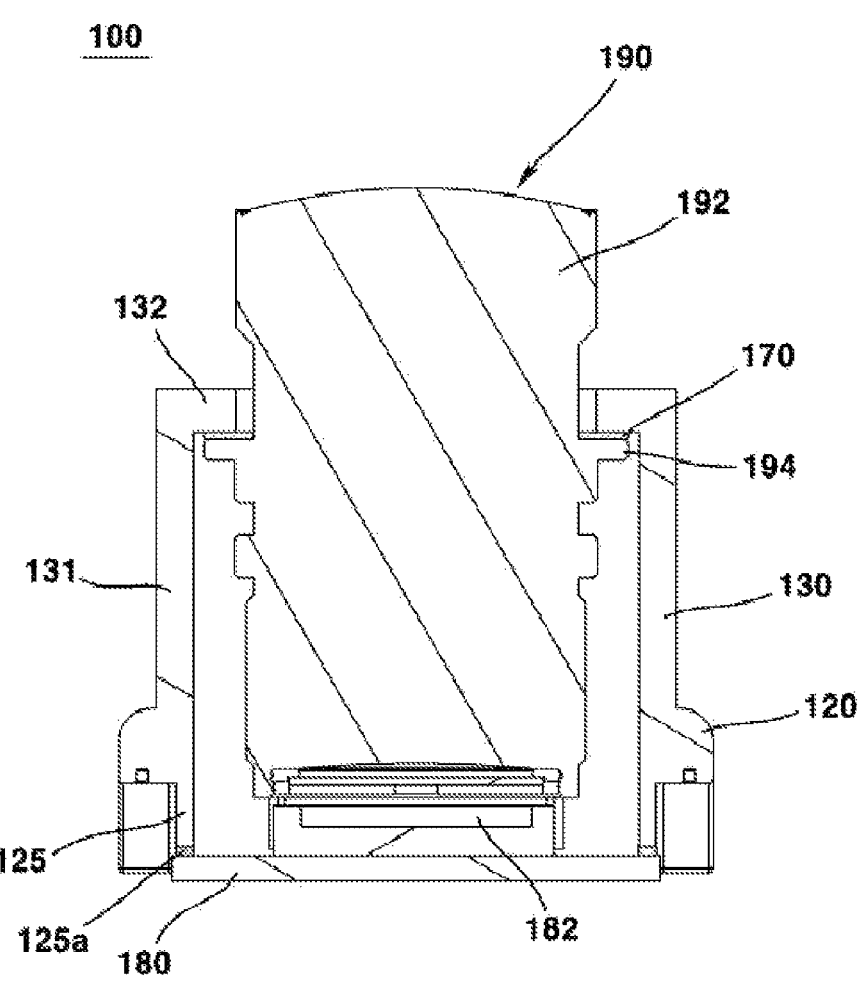
FIG. 5 is a cross-sectional view taken along line A-A' of FIG. 1.
Figure 6:
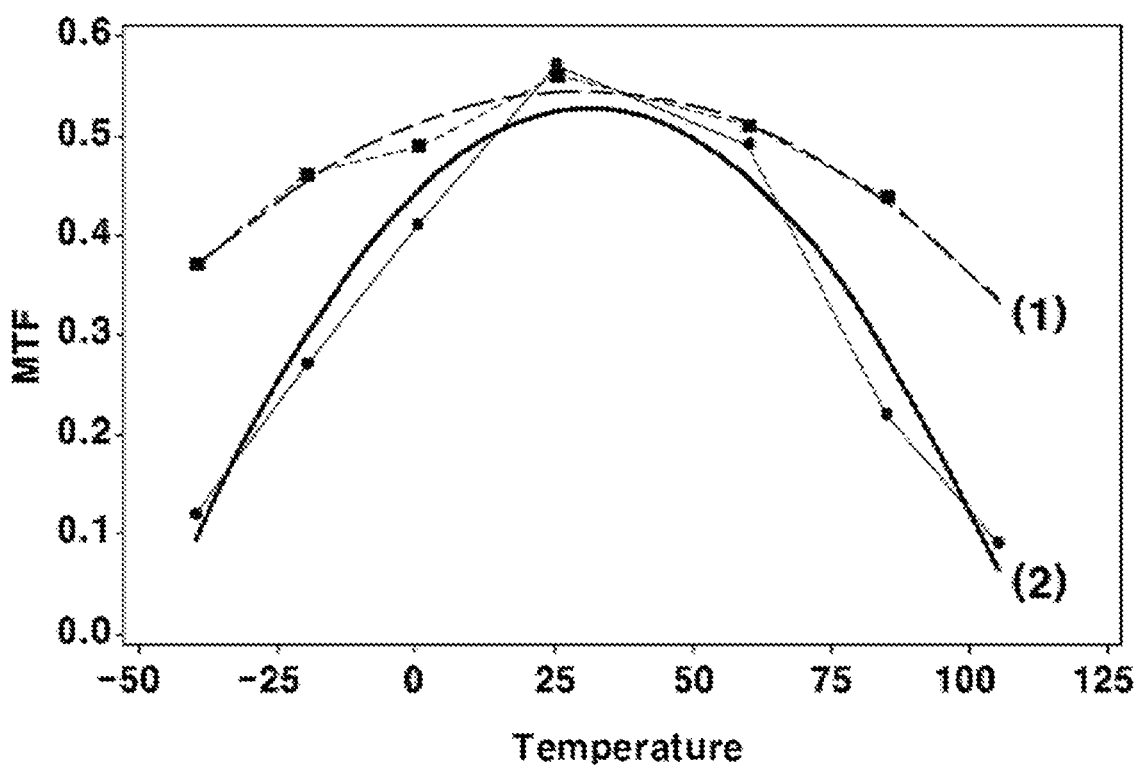
FIG. 6 is a graph comparing a change in distance between an image sensor and a lens for each temperature of a camera module according to a first embodiment of the present invention and a camera module according to the prior art.

FIG. 1 is a perspective view of a camera module according to a first embodiment of the present invention; FIG. 2 is a plan view illustrating a side surface of a camera module according to a first embodiment of the present invention; FIG. 3 is an exploded perspective view of a camera module according to a first embodiment of the present invention; FIG. 4 is an exploded perspective view of a camera module illustrating FIG. 3 from another angle; FIG. 5 is a cross-sectional view taken along line A-A' of FIG. 1; and FIG. 6 is a graph comparing a change in distance between an image sensor and a lens for each temperature of a camera module according to a first embodiment of the present invention and a camera module according to the prior art.

Referring to FIGS. 1 to 6, a camera module 100 according to an embodiment of the present invention may comprise: a housing 110; a lens module 190; a printed circuit board 180; and a coupling member 170, but it may be implemented excluding some of these configurations, and other additional configurations are not excluded.

The camera module 100 may include a housing 110. The housing 110 may form the outer appearance of the camera module 100. The upper and lower surfaces of the housing 110 may be opened. The material of the housing 110 may include a plastic or resin. The lens module 190 may be disposed inside the housing 110.

The housing 110 may include a front body 130 and a rear body 120. The front body 130 may be disposed at a front surface of the rear body 120. The rear body 120 may be disposed at a rear surface of the front body 130. The front body 130 and the rear body 120 may be formed as a single body, but is not limited thereto.

The cross section of the front body 130 may be formed in a circular shape, and an opening 112 through which the lens 190 penetrates may be formed on an upper surface thereof. The front body 130 may include: a side part 131 forming a side surface; and a top part 132 that is bent inward from the top of the side part 131 to form an upper surface. The front body 130 may also be referred to as a lens holder in that it accommodates the lens 190 therein. At least a portion of the lens 190 may be disposed in a space inside the front body 130. The top part 132 may cover a portion of the space inside the housing 110.

Meanwhile, the top part 132 may be referred to as a bent part in that it is bent inward from an upper end of the side part 131.

The rear body 120 may be disposed on a rear surface of the front body 130. A space 126 being communicated with a space inside the front body 130 may be formed inside the rear body 120. The space 126 may be partitioned from other regions by the second protrusion part 125.

The rear body 120 may include a second protrusion part 125. The second protrusion part 125 may be formed to be protruded downward from a lower surface of the rear body 120. The cross-sectional shape of the second protrusion part 125 may be formed in a ring shape. The lower end of the second protrusion part 125 may be protruded more downward than other regions of the lower surface of the rear body 120. The lower surface of the second protrusion part 125 may be disposed to face an upper surface of the printed circuit board 180. The lower surface of the second protrusion part 125 may be in contact with an upper surface of the printed circuit board 180. A separate sealing member (not shown) is disposed on an outer side surface of the second protrusion part 125 and may inhibit foreign substances from entering the space 126.

The protruded direction of the second protrusion part 125 may correspond to an optical axis direction of the camera module 100.

The lower end of the second protrusion part 125 may be coupled to an upper surface of the printed circuit board 180 through a third coupling member 125a. The distance between the lens 190 and the image sensor 182 may be adjusted through the third coupling member 125a. The third coupling member 125a may include epoxy or an O-ring. The thermal expansion coefficient of the third coupling member 125a may be smaller than that of the first coupling member 170 which will be described later.

A coupling part may be disposed on a lower surface of the rear body 120. The coupling part may be disposed at each corner region of a lower surface of the rear body 120. The second protrusion part 125 may be disposed inside the coupling part. The separate sealing member may be interposed between the coupling part and the second protrusion part 125. The coupling part is for coupling with other housing, and a thread hole for screw-coupling may be formed on a lower surface. The other housing may be coupled to the coupling part through screws.

The cross-sectional area of the rear body 120 may be larger than the cross-sectional area of the front body 130. The camera module 100 may include a printed circuit board 180. The printed circuit board 180 is formed in a plate shape and can be coupled to the housing 110, that is, to a lower surface of the rear body 120. An upper surface of the printed circuit board 180 may be in contact with a lower surface of the second protrusion part 125. At least one electronic component for driving the camera module 100 may be disposed on the printed circuit board 180. For an example, an image sensor 182 may be disposed on an upper surface of the printed circuit board 180. The image sensor 182 may be disposed to face the lens module 190 in an optical axis direction. The image sensor 182 may be disposed inside the space 126.

The camera module 100 may include a lens module 190. The lens module 190 may be disposed inside the housing 110. The lens module 190 may include at least one lens. The lens module 190 includes a plurality of lenses, and the plurality of lenses may be disposed along an optical axis direction. Among them, the outermost lens is disposed to be protruded upward from the housing 110 and may be exposed upward from the housing 110.

In detail, the lens module 190 may comprise: a first region 192 being protruded upward from the housing 110; a second region 195 being disposed in a space inside the housing 110; and a third region 193 being disposed between the first region 192 and the second region 195 and disposed inside the opening 112. The cross-sectional shape of the third region 190 may correspond to a cross-sectional shape of the opening 112. The cross-sectional area of the third region 190 may correspond to or be smaller than the cross-sectional area of the opening 112. The cross-sectional area of the third region 193 may be smaller than the cross-sectional area of the first region 192 or the second region 195. Accordingly, in the lens module 190, the first region 192 may be disposed outside the housing 110 and the second region 195 may be disposed in a space inside the housing 110. The lens module 190 may be disposed to face the image sensor 182 in an optical axis direction.

The lens module 190 may include a first protrusion part 194. The first protrusion part 194 may be protruded outward from a side surface of the lens module 190. The cross section of the first protrusion part 194 may be formed in a ring shape. An end portion of the first protrusion part 194 being extended outward may be disposed more outward than the side surface of the lens module 190. The first protrusion part 194 may be disposed at a lower portion of the third region 193. The first protrusion part 194 may be disposed in a space inside the housing 110. The first protrusion part 194 may be disposed at a lower portion of the top part 132. An upper surface of the first protrusion part 194 may be disposed to face a lower surface of the top part 132. An upper surface of the first protrusion part 194 may be overlapped with a lower surface of the top part 132 in an up and down direction.

The protruded direction of the first protrusion part 194 may be perpendicular to an optical axis direction of the camera module 100.

The camera module 100 may include a coupling member 170. The coupling member 170 may be referred to as a first coupling member 170. The coupling member 170 may be disposed in a space inside the housing 110. The coupling member 170 may be disposed between the lens module 190 and the housing 110. The coupling member 170 may be disposed between the lower surface of the top part 132 and the upper surface of the first protrusion part 194. The coupling member 170 may have a ring-shaped cross section.

The coupling member 170 may be referred to as an adhesive member in that it attaches the lens module 190 and the housing 110 to each other. The coupling member 170 may also be called a sealing member in that it seals a space between the lens module 190 and the housing 110. The material of the coupling member 170 may include at least one of an epoxy, a rubber, and a plastic. For example, the coupling member 170 may be an epoxy applied between an upper surface of the first protrusion part 194 and a lower surface of the top part 132. The coupling member 170 not only inhibits external foreign substances from entering the housing 110, but also can minimize the change in distance between the image sensor 182 and the lens module 190 due to a temperature change of the camera module 100. In detail, at a high temperature, the housing 110 may be expanded due to material characteristics of the housing 110. According to this, based on FIG. 5, the housing 110 may be elongated in an up and down direction, and a distance between the image sensor 182 and the lens module 190 in an optical axis direction may be increased. However, according to the present embodiment, the coupling member 170 also expands due to high temperature, and as a result, the distance between the lens module 190 and the image sensor 182 may be reduced by the expansion of the housing 110.

Similarly, at low temperatures, the housing 110 may contract. According to this, based on FIG. 5, the housing 110 may be shortened in an up and down direction, and a distance between the image sensor 182 and the lens module 190 in an optical axis direction may be reduced. At this time, the coupling member 170 is contracted by low temperature, and as a result, the shortened distance between the lens module 190 and the image sensor 182 may be expanded by contraction of the housing 110.

In summary, by changing the distance between the lens module 190 and the image sensor 182 in the opposite direction by the deformation of the coupling member 170 as much as the change in the distance between the lens module 190 and the image sensor 182 due to the deformation of the housing 110 according to a temperature change, the distance between the image sensor 182 and the lens module 190 can be kept constant.

The material of the coupling member 170 may be selected to a level capable of compensating for the temperature-induced deformation of the housing 110 in consideration of the thermal expansion coefficient of the housing 110.

The thermal expansion coefficient of the first coupling member 170 may be greater than the thermal expansion coefficient of the third coupling member 125a. The thermal expansion coefficient of the first coupling member 170 may have a value 2 to 6 times greater than the thermal expansion coefficient of the third coupling member 125a. The above-described ratio of thermal expansion coefficients of the first coupling member 170 and the third coupling member 125a may be defined under an environment where the temperature range of a region in which the camera module 10 is disposed is −40 degrees to 105 degrees. The thermal expansion coefficient is measured through a thermo mechanical analyzer (TMA) device, through the above-described thermal expansion coefficient ratio of the first coupling member 170 and the third coupling member 125a, the change in distance between the lens module 190 and the image sensor 182 of the camera module 10 can be minimized under different environmental conditions. In summary, when the first coupling member 170 expands, the first coupling member 170 can control the distance of the lens module 190 from the image sensor 182, and when the first coupling member 170 is thermally contracted, the first coupling member 170 may control the approaching of the lens module 190 to the image sensor 182.

In addition, with respect to an optical axis direction of the camera module 10, the thickness of the first coupling member 170 may be thicker than the thickness of the third coupling member 125*a*. For example, the thickness of the first coupling member 170 may be 0.5 mm to 1.0 mm, and the thickness of the third coupling member 125*a* may be 0.2 mm to 0.5 mm. According to the above structure, since the relatively thick first coupling member 170 is less deformed than the third coupling member 125*a*, the distance between the image sensor 182 and the lens module 190 can be maintained constant.

Referring to FIG. 6, in the case of the camera module according to the present embodiment, as in the graph (1), when compared with the graph (2) of the camera module according to the prior art, it can be confirmed that the distance between the image sensor and the lens module can be maintained uniformly in the entire regions by temperature.

According to the structure as described above, there are advantages in that since deformation of the housing due to temperature change is compensated through the coupling member, it is possible to minimize the change in distance between the image sensor 182 and the lens module 190 due to temperature change, and accordingly, the resolution of the camera module can be stabilized.

Figure 7:
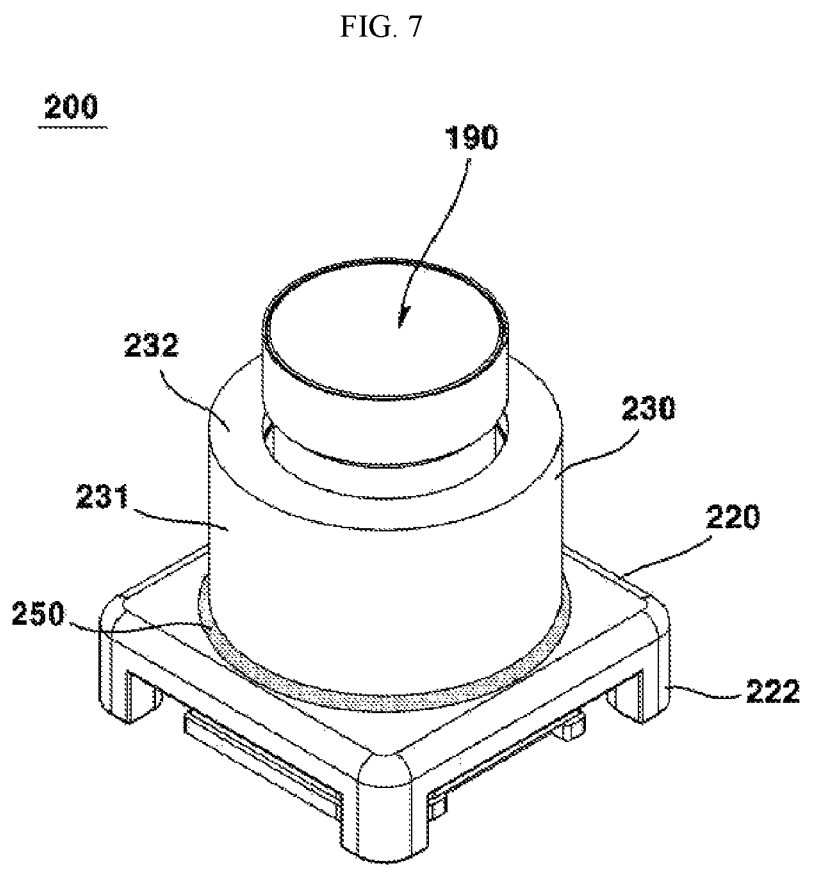
Figure 8:
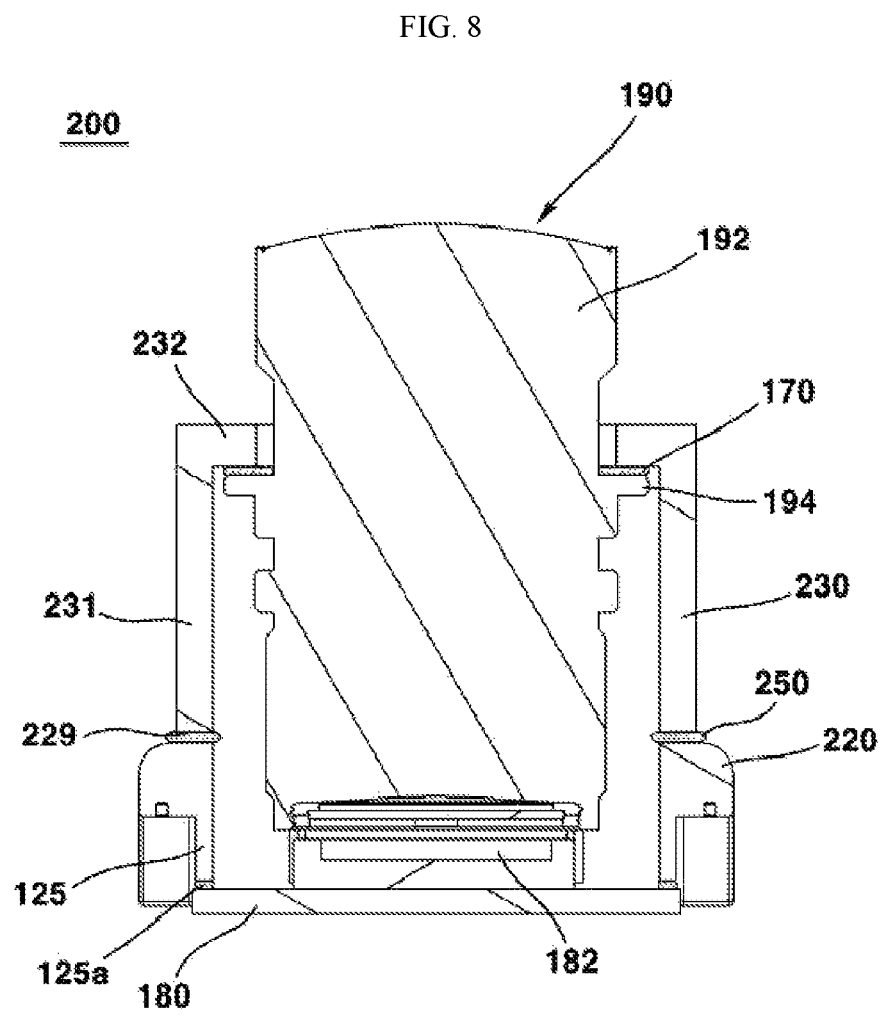

FIG. 7 is a perspective view of a camera module according to a second embodiment of the present invention; and FIG. 8 is a cross-sectional view of a camera module according to a second embodiment of the present invention.

In this embodiment, other parts are the same as the first embodiment, but there are differences in the structure of the housing and in that the second coupling member is being added. Therefore, only the characteristic parts of the present embodiment will be described below, and the description of the first embodiment will be used for the remaining parts.

Referring to FIGS. 7 and 8, a camera module 200 according to a second embodiment of the present invention may include: a housing; a lens module 190; a printed circuit board 180; a coupling member 170; and a second coupling member 250.

A housing according to the present embodiment may be formed by coupling the lens holder 230 and the rear body 220. The lens holder 230 may replace the front body 130 of the camera module 100 according to a first embodiment. The rear body 220 may replace the rear body 120 of the camera module 100 according to a first embodiment. Accordingly, the lens holder 230 may include an upper surface portion 232 and a side surface portion 231, and the rear body 220 may include configurations related to the second protrusion part 125 and the coupling part inside the rear body 120 according to a first embodiment.

However, in the present embodiment, the lens holder 230 and the rear body 220 may be spaced apart from each other. Accordingly, a separation part 229 may be formed on a side surface of the housing. The separation part 229 may be disposed to penetrate the inner surface from the outer surface of the housing. A lower end of the lens holder 230 and an upper end of the rear body 220 may be spaced apart from each other by the separation part 229. The separation part 229 may be disposed in a boundary region between the lens holder 230 and the rear body 220. The separation part 229 may have a hole shape penetrating the inner surface from the outer surface of the housing forming the outer shape of the camera module 10.

A second coupling member 250 may be disposed in the separation part 229. The second coupling member 250 is formed in a ring shape and can be accommodated inside the separation part 229. In some cases, an outer surface of the second coupling member 250 may be protruded more outward than a side surface of the lens holder 230. Also, an inner surface of the second coupling member 250 may be protruded more inward than an inner surface of the space inside the lens holder 230.

The material of the second coupling member 250 may include at least one among an epoxy, a rubber, and a plastic. For an example, the second coupling member 250 may be an epoxy applied between the lens holder 230 and the rear body 220.

A lower end of the lens module 190 may be disposed lower than the second coupling member 250 in an optical axis direction.

Meanwhile, the coupling member 170 of the first embodiment described above may be referred to as the first coupling member 170 in the present embodiment.

The second coupling member 250 not only couples the lens holder 230 and the rear body 220 to each other, but also can minimize the change in distance between the image sensor 182 and the lens module 190 due to the temperature change of the camera module 200.

In detail, at a high temperature, the lens holder 230 and the second coupling member 250 may be expanded due to material characteristics of the lens holder 230 and the second coupling member 250. According to this, based on FIG. 8, the lens holder 230 and the second coupling member 250 become longer in an up and down (optical axis) direction, and the distance between the image sensor 182 and the lens module 190 in an optical axis direction can be lengthened, but according to this embodiment, the first coupling member 170 is also expanded due to high temperature, and as a result, the distance between the lens module 190 and the image sensor 182 may be reduced by expansion of the lens module 230 and the second coupling member 250.

Similarly, at a low temperature, the lens holder 230 and the second coupling member 250 may contract. According to this, based on FIG. 8, the lens holder 230 and the second coupling member 250 become shortened in an up and down (optical axis) direction, and the distance between the image sensor 182 and the lens module 190 in an optical axis may become shortened. At this time, the first coupling member 170 is contracted by the low temperature, and as a result, due to the contraction of the lens holder 230, the distance between the lens module 190 and the image sensor 182 that has been shortened can be expanded.

On the other hand, since the expansion and contraction of the second coupling member 250 according to the temperature change are performed in the same direction as the expansion and contraction of the lens holder 230, by forming the thermal expansion coefficient of the first coupling member 170 to be greater than the thermal expansion coefficient of the second coupling member 250, the distance change value between the lens module 190 and the image sensor 182 by the first coupling member 170 can be adjusted to accommodate the distance change value between the lens module 190 and the image sensor 182 caused by the lens holder 230 and the second coupling member 250.

In this case, the thermal expansion coefficient of the first coupling member 170 may have a value 2 to 6 times greater than the thermal expansion coefficient of the second coupling member 250. The above-described ratio of thermal expansion coefficients of the first coupling member 170 and the second coupling member 250 may be defined under an environment in a region where the camera module 10 is disposed in which the temperature range is –40 degrees to 105 degrees. The thermal expansion coefficient is measured through a thermo mechanical analyzer (TMA) device, the distance between the lens module 190 and the image sensor 182 of the camera module 10 can be maintained constant under different environmental conditions through the above-described thermal expansion coefficient ratio of the first coupling member 170 and the second coupling member 250.

Furthermore, with respect to an optical axis direction of the camera module 10, the thickness of the first coupling member 170 may be thicker than the thickness of the second coupling member 250. For example, the thickness of the first coupling member 170 may be 0.5 mm to 1.0 mm, and the thickness of the second coupling member 250 may be 0.2 mm to 0.5 mm. According to the above structure, since the relatively thick first coupling member 170 is less deformed than the second coupling member 250, the distance between the image sensor 182 and the lens module 190 can be maintained constant.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A camera module comprising:
   a lens holder including a side portion and a top part formed with an opening therein;
   a lens module coupled to the lens holder; and
   a substrate coupled to the lens holder and on which an image sensor is disposed,
   wherein the lens module includes a first protrusion part disposed below a top part of the lens holder,
   wherein a first coupling member couples the first protrusion part to the top part of the lens holder,
   wherein a rear body is disposed on a rear surface of the lens holder,
   wherein a separation part is disposed between the lens holder and the rear body,
   wherein a second coupling member is disposed in the separation part, and
   wherein a thermal expansion coefficient of the first coupling member is greater than a thermal expansion coefficient of the second coupling member.

2. The camera module according to claim 1,
   wherein the first coupling member includes an epoxy.

3. The camera module according to claim 1,
   wherein a material of the lens holder includes a plastic.

4. The camera module according to claim 1,
   wherein the second coupling member includes an epoxy.

5. The camera module according to claim 1,
   wherein a lower end of the lens module is disposed at a lower portion than the second coupling member in an optical axis direction.

6. The camera module according to claim 1,
   wherein the thermal expansion coefficient of the first coupling member is 2 to 6 times greater than that of the second coupling member.

7. The camera module according to claim 1, wherein a third coupling member is disposed between the lens holder and the substrate.

8. The camera module according to claim 7, wherein based on an optical axis direction, a thickness of the third coupling member is smaller than a thickness of the first coupling member.

9. The camera module according to claim 7, wherein a coefficient of thermal expansion of the first coupling member is greater than a coefficient of thermal expansion of the third coupling member.

10. The camera module according to claim 1, wherein based on an optical axis direction, a thickness of the second coupling member is smaller than a thickness of the first coupling member.

11. The camera module according to claim 1, wherein when the first coupling member thermally expands, the first coupling member controls a distance of the lens module from the image sensor.

12. The camera module according to claim 1, wherein when the first coupling member is thermally contracted, the first coupling member controls the lens module to come closer to the image sensor.

13. A camera module comprising:
    a lens module including a lens;
    a lens holder coupled to the lens module;
    a substrate coupled to the lens holder and on which an image sensor is disposed;
    a first coupling member that couples the lens module and the lens holder; and
    a second coupling member that couples the substrate and the lens holder,
    wherein a thermal expansion coefficient of the first coupling member is greater than a thermal expansion coefficient of the second coupling member.

14. The camera module according to claim 13, wherein when the first coupling member thermally expands, the first coupling member controls a distance of the lens module from the image sensor.

15. The camera module according to claim 13, wherein when the first coupling member is thermally contracted, the first coupling member controls the lens module to come closer to the image sensor.

16. The camera module according to claim 13, wherein each of the first coupling member and the second coupling member is epoxy.

17. The camera module according to claim 13, wherein the lens holder includes an opening, and
    wherein the lens module is disposed to pass through the opening.

* * * * *